(12) United States Patent
Aaron (10) Patent No.: US 8,160,548 B2
(45) Date of Patent: Apr. 17, 2012

(54) DISTRIBUTED ACCESS CONTROL AND AUTHENTICATION

(75) Inventor: Jeffrey Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1063 days.

(21) Appl. No.: 11/611,345

(22) Filed: Dec. 15, 2006

(65) Prior Publication Data
US 2008/0148369 A1 Jun. 19, 2008

(51) Int. Cl.
*H04M 1/66* (2006.01)

(52) U.S. Cl. ............ 455/411; 455/419; 455/420; 726/5; 726/27; 726/28

(58) Field of Classification Search .................. None
See application file for complete search history.

(56) References Cited

U.S. PATENT DOCUMENTS

| | | | |
|---|---|---|---|
| 4,853,628 A | 8/1989 | Gouldsberry et al. | |
| 5,505,057 A | 4/1996 | Sato et al. | |
| 5,812,932 A | 9/1998 | Wiedeman et al. | |
| 6,130,707 A | 10/2000 | Koller et al. | |
| 6,580,914 B1 | 6/2003 | Smith | |
| 6,587,835 B1 | 7/2003 | Treyz et al. | |
| 6,853,628 B2 | 2/2005 | Chitrapu | |
| 6,892,217 B1 | 5/2005 | Hanmann et al. | |
| 6,912,398 B1 | 6/2005 | Domnity | |
| 6,947,976 B1 | 9/2005 | Devitt et al. | |
| 6,977,997 B2 | 12/2005 | Shioda et al. | |
| 7,046,987 B2 | 5/2006 | Siegel et al. | |
| 7,109,859 B2 | 9/2006 | Peeters | |
| 7,136,658 B2 | 11/2006 | Cole et al. | |
| 7,136,688 B2 | 11/2006 | Jung et al. | |
| 7,155,238 B2 | 12/2006 | Katz | |
| 7,324,959 B2 | 1/2008 | Malkin et al. | |
| 7,599,795 B1 | 10/2009 | Blumberg et al. | |
| 7,634,228 B2 | 12/2009 | White et al. | |
| 7,781,666 B2 | 8/2010 | Nishitani et al. | |
| 2002/0082931 A1 | 6/2002 | Siegel et al. | |
| 2002/0095333 A1 | 7/2002 | Jokinen et al. | |
| 2002/0147928 A1 | 10/2002 | Mahajan | |
| 2002/0178385 A1* | 11/2002 | Dent et al. ................... | 713/202 |
| 2003/0006913 A1 | 1/2003 | Joyce | |
| 2003/0008661 A1 | 1/2003 | Joyce | |
| 2003/0050039 A1 | 3/2003 | Baba et al. | |
| 2003/0198204 A1 | 10/2003 | Taneja et al. | |
| 2004/0032503 A1 | 2/2004 | Monden et al. | |
| 2004/0082351 A1 | 4/2004 | Westman | |

(Continued)

OTHER PUBLICATIONS

U.S. Appl. No. 11/610,898, filed Dec. 14, 2006.

(Continued)

*Primary Examiner* — Rafael Pérez-Gutiérrez
*Assistant Examiner* — Daniel Nobile
(74) *Attorney, Agent, or Firm* — Parks IP Law LLC; Jennifer P. Medlin, Esq.

(57) ABSTRACT

Presented are apparatus and method for distributed authentication and control of an electronic security device. The method includes prompting an authority for access to an ESS and providing a response package by the authority, wherein the response package comprises a first hash value combining challenge data and a pass code for the ESS. Upon receipt of the response package, the first hash value and a second hash value generated by the by the ESS may be prepared and if the first hash value and the second hash values match, the ESS may be unlocked.

17 Claims, 5 Drawing Sheets

U.S. PATENT DOCUMENTS

| | | | |
|---|---|---|---|
| 2004/0092269 A1 | 5/2004 | Kivinen | |
| 2004/0110515 A1 | 6/2004 | Blumberg et al. | |
| 2004/0141606 A1 | 7/2004 | Torvinen | |
| 2004/0209602 A1 | 10/2004 | Joyce | |
| 2005/0073406 A1 | 4/2005 | Easley et al. | |
| 2005/0075116 A1 | 4/2005 | Laird et al. | |
| 2005/0113123 A1 | 5/2005 | Torvinen | |
| 2005/0117516 A1 | 6/2005 | Yang | |
| 2005/0149443 A1 | 7/2005 | Torvinen | |
| 2005/0153729 A1 | 7/2005 | Logan et al. | |
| 2005/0176420 A1 | 8/2005 | Graves et al. | |
| 2005/0181824 A1 | 8/2005 | Lloyd | |
| 2005/0215238 A1 | 9/2005 | Macaluso | |
| 2005/0221876 A1 | 10/2005 | Van Bosch et al. | |
| 2005/0248456 A1 | 11/2005 | Britton et al. | |
| 2005/0266870 A1 | 12/2005 | Benco et al. | |
| 2005/0288038 A1 | 12/2005 | Kim | |
| 2006/0009240 A1* | 1/2006 | Katz | 455/457 |
| 2006/0015404 A1 | 1/2006 | Tran | |
| 2006/0033625 A1 | 2/2006 | Johnson et al. | |
| 2006/0089158 A1 | 4/2006 | Lai et al. | |
| 2006/0095540 A1 | 5/2006 | Anderson et al. | |
| 2006/0194595 A1 | 8/2006 | Myllynen et al. | |
| 2006/0224863 A1* | 10/2006 | Lovett et al. | 712/215 |
| 2006/0253453 A1 | 11/2006 | Chmaytelli et al. | |
| 2007/0004393 A1* | 1/2007 | Forsberg et al. | 455/420 |
| 2007/0037561 A1 | 2/2007 | Bowen et al. | |
| 2007/0037605 A1 | 2/2007 | Logan | |
| 2007/0054687 A1 | 3/2007 | Akita et al. | |
| 2007/0136796 A1* | 6/2007 | Sanchez et al. | 726/5 |
| 2007/0182544 A1 | 8/2007 | Benson et al. | |
| 2007/0182818 A1 | 8/2007 | Buehler | |
| 2007/0232342 A1 | 10/2007 | Larocca | |
| 2007/0287379 A1 | 12/2007 | Matsuura et al. | |
| 2008/0004951 A1 | 1/2008 | Huang et al. | |
| 2008/0032677 A1 | 2/2008 | Catovic et al. | |
| 2008/0045236 A1 | 2/2008 | Nahon et al. | |
| 2008/0052169 A1 | 2/2008 | O'Shea et al. | |
| 2008/0114778 A1 | 5/2008 | Siegel | |
| 2008/0146205 A1 | 6/2008 | Aaron | |
| 2008/0169921 A1 | 7/2008 | Peeters | |
| 2008/0182563 A1 | 7/2008 | Wugofski et al. | |
| 2008/0182586 A1 | 7/2008 | Aaron | |
| 2008/0268895 A1 | 10/2008 | Foxenland | |
| 2009/0176524 A1 | 7/2009 | David | |
| 2009/0292920 A1 | 11/2009 | Willey | |

OTHER PUBLICATIONS

U.S. Appl. No. 11/843,954, filed Aug. 23, 2007.
U.S. Appl. No. 11/610,890, filed Dec. 14, 2006.
U.S. Appl. No. 11/611,434, filed Dec. 15, 2006.
U.S. Appl. No. 11/610,927, filed Dec. 14, 2006.
U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/627,260, filed Jan. 25, 2007.
U.S. Appl. No. 11/668,848, filed Jan. 30, 2007.
U.S. Appl. No. 11/627,269, filed Jan. 25, 2007.
Helio GPS-powered Buddy Beacon, http://www.helio.com, date unknown, believed to exist before filing of the present application.
GPS Locator Phone, http://www.wherify.com/wherifone/kids.html?page-kids, copyright 2006, believed to exist before filing of the present application.
Dodgeball.com bringing your phone to life. http://www.dodgeball.com , copyright 2006, believed to exist before filing of the present application.
OnStar Technology, http://www.onstar.com/US_english/jsp/explore/onstar_basics/technology.jsp, copyright 2006, believed to exist before filing of the present application.
Huang et al., "A Self-Adaptive Zone Routing Protocol for Bluetooth Scatternets", pp. 1-16.
Woodings et al., "Rapid Heterogeneous Connection Establishment: Accelerating Bluetooth Inquiry Using IrDA", pp. 1-14.
Helio: GPS Cell Phone Enabled With Google Maps & Buddy Beacon, www.helio.com.
Palo Wireless "K1—Generic Access Profile", http://www.palowireless.com/infotooth/tutorial/k1_gap.asp (Internet Archive Wayback Machine) pp. 1-8 (2004).
Aalto et al., "Bluetooth and WAP Push Based Location-Aware Mobile Advertising System", pp. 49-58.

* cited by examiner

DISTRIBUTED ACCESS CONTROL AND AUTHENTICATION

TECHNICAL FIELD

The subject matter described herein relates to an apparatus and method for creating a "virtual key" for distributed access control based on random encryption.

BACKGROUND

Today, most people carry a cellular telephone or other personal communication device such as a PDA, wireless phone, MP3 player or an interactive pager. These ubiquitous communication devices may be adapted to a myriad of new uses including the physical and information security.

Wireless unlocking can currently be accomplished utilizing other technologies such as with Radio Frequency Identification ("RFID") access cards, magnetic card readers, keyless entry fobs for automobiles, radio transmissions such as garage door openers and similar devices. However, none of these technologies is capable of granting temporary permission and unlocking ability remotely other than physically providing the unlocking device or pass code to the person being granted the access. As such, the grant of such temporary access is not truly secure since the grantee possesses the key or code and can access the locking device as long as he possesses the key or code. In addition, keys may be misplaced and combinations forgotten.

SUMMARY

A secure ability to grant access to an electronic locking device is provided by transforming a user's personal wireless communication device ("WCD") into a virtual key utilizing a random, cryptographic approach.

Exemplary embodiments of a WCD consistent with this disclosure may contain a radio frequency ("RF") transceiver capable of communicating wirelessly with a telecommunications network and a secondary transceiver capable of wirelessly communicating with an electronic security system ("ESS"). The telecommunication network may be a cellular telecommunications network. The WCD may also contain a memory device and a processor in communication with the memory device, the RF transceiver and the secondary receiver. The processor may be capable of generating a first hash using challenge data transmitted from the ESS and a pass code for the ESS, wherein the hash is transmitted via the secondary transceiver to the ESS whereby the ESS is unlocked.

Exemplary embodiments of a method for distributed authentication consistent with this disclosure may include prompting an authority for access to an ESS and receiving a first hash value from the authority Upon receipt of the response package, the first hash value and a second hash value generated by the by the ESS may be compared and if the first hash value and the second hash values match, the ESS may be unlocked.

Further embodiments of this disclosure may include a computer readable medium upon which are recorded instructions to prompt for and receive a response package from an authority, wherein the response package containing a first hash value from an authority which combines challenge data and the pass code for an ESS. The instructions may generate a second hash value and compare the first hash value and a second hash value. If the first hash value and the second hash values match then the ESS may be unlocked.

DETAILED DESCRIPTION

The following detailed description is directed to a systems and methods for providing distributed access and control via a wireless communication device ("WCD"). References are made to the accompanying drawings that form a part hereof and which are shown, by way of illustration, using specific embodiments or examples. Referring now to the drawings, in which like numerals represent like elements through the several figures, aspects of the apparatus and methods provided herein will be described.

Cell phones and other personal communications devices are ubiquitous in society. Most adults and a growing number of children carry a cell phone or other WCD on their person frequently, particularly when they are away from home. In addition to convenience, the wireless communication device is look upon as a safety device that may be used to summon assistance. In the same vein, a WCD may be used as a universal key that may be used to open a plethora of physical and software security systems. The configuration of a WCD as a universal key would reduce the need to carry metal keys or remember combinations both of which are often lost and forgotten. Such a universal key may also be used by emergency personnel to gain access to a potentially infinite number of secure spaces in the event of fire or other emergency. For example, police officers responding to an emergency call and encountering a locked access door may bring their wireless communication devices within proximity to the lock configured to enable such access and a the touch of a button be able to unlock the door, all without worrying about a key or gaining entry by force.

Figure 1A:
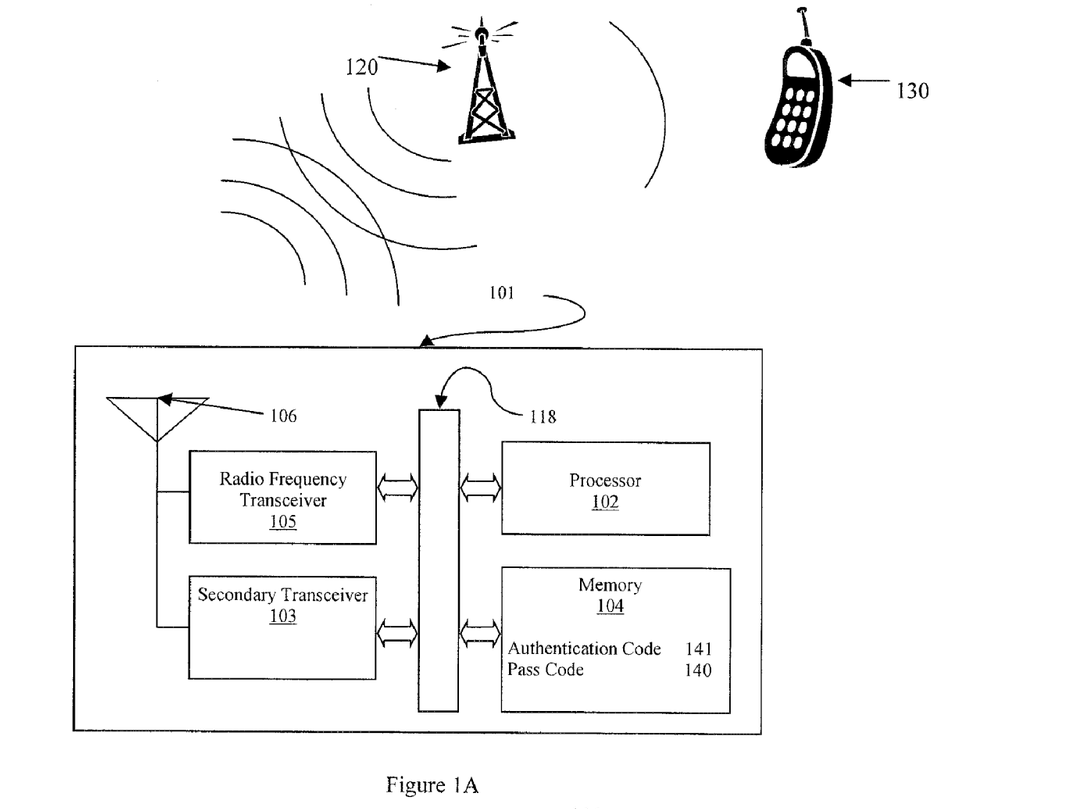
FIG. 1A is a block diagram illustrating exemplary functional components that may be found in one example of a wireless communication device with remote unlocking capability.

FIG. 1A is a block diagram illustrating functional components that may be found in a WCD 101. The WCD 101, such as a cell phone, may have one or more communication transceivers and their corresponding antenna(s) 106. The communications transceivers may include a RF transceiver 105 and a secondary transceiver 103. The RF transceiver 105 may be capable of communicating wirelessly with a telecommunications network 120. A non-limiting example of the telecommunications network 120 may be a cellular telecommunications network such as a GSM or PCS network. Other networks may include a satellite communications network, a WiMax network or other intermediate or long distance wireless communication network.

The secondary transceiver 103 may be a short range transceiver capable of communicating with other local wireless devices. Non-limiting examples of local wireless devices include, but are not limited to, an electronic security device ("ESS") 111, a computing device, PDA, pager, cell phone, headset or MP3 player. The secondary transceiver 103 may communicate via a short range radio format standard. Non-limiting examples of such formats may include Bluetooth®, Ultra-Wideband (UWB), Wireless USB (WUSB), Wi-Fi (IEEE 802.11), WiMAX, WiBro, infrared, near-field magnetics and HiperLAN standards. Optionally, the secondary transceiver 103 may communicate optically using the infrared, ultraviolet, or other spectrum. The secondary transceiver 103 may also communicate via sound transmission. Further, there may be multiple secondary transceivers 103 which may communicate with other local devices in a combination including optically, audibly or by radio transmission. The interface between ESS 111 and the WCD 101 may also be a wired interface.

The WCD 101 may also include a memory device 104. The memory 104 may be comprised of any number or types of devices that conform to a manufacturer's requirements. Examples of memory devices include magnetic disks, flash memory, memory sticks, Random Access Memory, and Read Only Memory. The foregoing list of useful memory devices continues to grow over time and any specific examples mentioned herein are not intended to limit the particular device mentioned herein. The memory 104 may contain varied information and/or instructions and may include pass codes 140 for one or more security systems such as the ESS 111, challenge data 251 received from one or more of the ESS and authorization codes/certificates 141.

The WCD 101 may also include a processor 102 in communication with each of the memory 104 and the communication transceiver 103 and 105. The processor 102 may be a general purpose programmable processor, an application specific processor, or a combination thereof. The processor 102 may be capable of generating a response package that may comprise a first hash specific to a particular ESS, such as ESS 111. The response package may be created by hashing the ESS's pass code 142 and any challenge data 251 (or a "challenge token") received from the particular ESS 111, where the pass code and challenge "token" may be concatenated or combine din any suitable manner prior to being hashed. A challenge token may be generated randomly, it may be associated with a particular ESS, such as the ESS 111, or it may have a random portion and an associated portion. The processor 102 and the memory 104 are examples of computer readable media which store instructions that when performed implement various logical operations. Such computer readable media may include various storage media including electronic, magnetic, and optical storage.

Communication between each of the communication transceivers 103/105, the memory 104, the processor 102 and any other elements of the WDC 101 may be facilitated by a bus 118. Bus 118 may be comprised of one or a plurality of busses as is desired by a manufacturer.

Figure 1B:
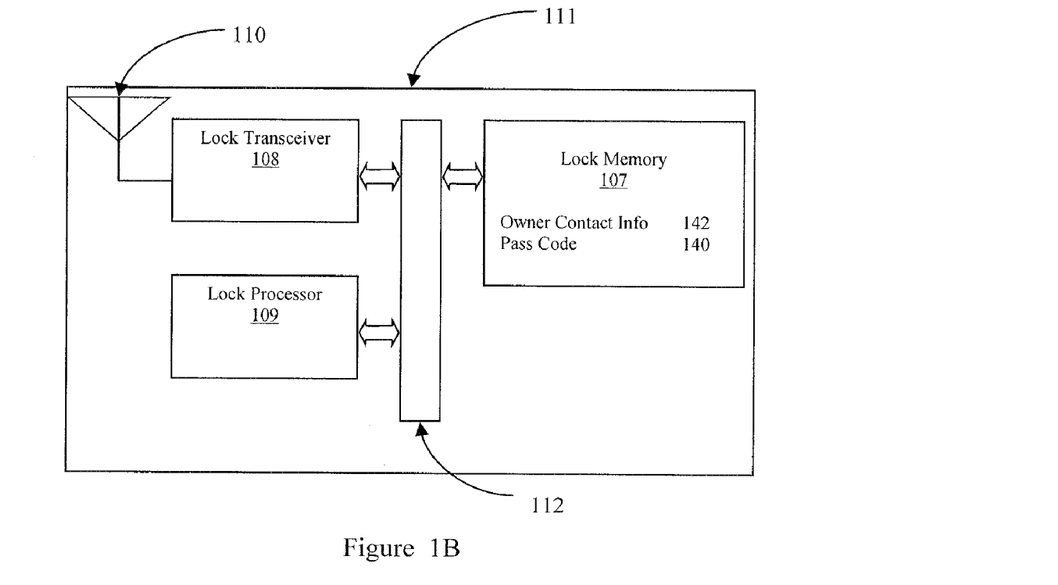
FIG. 1B is a block diagram illustrating exemplary functional components that may be found in one example of a ESS.

Being ubiquitous, the WCD 101 may be used as a universal key to wirelessly unlock any number of different configurations of ESS's 111. The ESS 111 may include, but is not limited to, an apparatus, a software object, firmware or combination thereof that may be in communication with the lock processor 109 and/or the lock transceiver 108. Lock transceiver 108 may be capable of communicating wirelessly with the WCD 101. However, the interface between the ESS 111 and the WCD 101 may also be a wired interface. Non-limiting examples of apparatus that may be designed with the ESS 111 may include a physical lock with a clasp, a safe, a car and a door lock. A myriad of apparatus may be designed with an ESS and any illustrative examples discussed herein are not to be construed as limiting as the possibilities are too voluminous to be recited herein.

Further, the ESS 111 may comprise a software object restricting access to another software object. Non-limiting examples of such restricted software objects may include an operating system for a computing device, an access control function, an authentication function, a data file or a software application. The ESS 111 may also restrict access to different parts of a software program such as between advancement levels in a computer game. Such uses listed here are illustrative only. Additional variations as required may also prove useful.

FIG. 1B is a block diagram illustrating functional components that may be found in the ESS 111. ESS 111 may include, or be in communication with, the lock transceiver 108 and an antenna 110 corresponding to the lock transceiver. Lock transceiver 108 may be a short range transceiver capable of communicating with other local wireless devices such as, but not limited to the WCD 101, a computing device, PDA, pager, cell phone, headset or MP3 player.

The lock transceiver 108 of the ESS 111 and the secondary transceiver 103 of the WCD 101 may each be capable of intercommunication using a short range radio standard including but not limited to, Bluetooth®, Ultra-Wideband (UWB), Wireless USB (WUSB), Zigbee (IEEE 802.15.4), Wi-Fi (IEEE 802.11), WiMAX, WiBro, near-field magnetics and HiperLAN standards. Lock transceiver 108 and secondary transceiver 103 may also intercommunicate optically using the infrared, ultraviolet, or other spectrum. Lock transceiver 108 and secondary transceiver 103 may also intercommunicate via sound transmission. The interface between the ESS 111 and WCD 101 may also be a wired interface.

The ESS 111 may also include a lock memory 107. Lock memory 107 may be comprised of any number or types of memory devices that conform to a manufacturer's requirements. Examples of memory devices include magnetic disks, flash memory, memory sticks, Random Access Memory, and Read Only Memory. The list of useful memory devices continues to grow over time and any specific examples mentioned herein are not intended to limit the particular device discussed. Lock Memory 107 may contain varied information and/or instructions which may include pass codes 140 for the ESS 111, ESS owner contact information 142 and other data.

The owner contact information 142 may include information stored in lock memory 107 whereby an entity desiring to unlock the ESS 111 (or a device associated with the ESS 111) may contact the owner of the ESS 111 to receive permanent or temporary access to unlock or disengage the ESS. In exemplary embodiments, the owner contact information 142 may include a cell phone number. As non-limiting examples, the owner contact information 142 may also include an IP address, a telephone number, a web address, a name, work and/or home address, and employer or affiliations.

The ESS 111 may also include a lock processor 109 in communication with the lock memory 107 and the lock transceiver 108. The lock processor 109 may be capable of generating a second hash unique to a particular ESS, such as the ESS 111, by hashing the ESS's pass code 140 and any ESS challenge token 251 by the same technique as is used to generate the first hash 253 (See FIG. 2C). The challenge token 251 used may have been previously transmitted from the particular ESS 111 to a requesting WCD, such as WCD 101, where the ESS's pass code 140 and challenge token 251 may have been concatenated and/or combined to generate the first hash 253. The ESS 111 may transmit the challenge data 251 to the WCD 101 upon being electronically prompted with a wireless unlock request message 252 transmitted by the WCD 101.

The lock processor 109 may also be capable of comparing the first hash 253 received in the response package from the WCD 101 and the second hash generated by the ESS 111. According to exemplary embodiments, if the first and second hashes match, the lock processor 109 may cause ESS 111 to physically unlock or otherwise may allow access to a device, software object and/or software program associated with the ESS. The first hash 253 based on the challenge token 251 may be limited to a single use, over a period of time or via schedules such as by certain days of the week and/or time of day. There also may be multiple hashes in existence in multiple WCDs used by multiple individuals all with authorized access to the same ESS 111.

Communication between each of the lock transceiver 108, lock memory 107, lock processor 109 and any other elements comprising ESS 111 may be facilitated by a bus 112. Bus 112 may be comprised of one or a plurality of busses as is desired by a manufacturer.

Figure 2A:
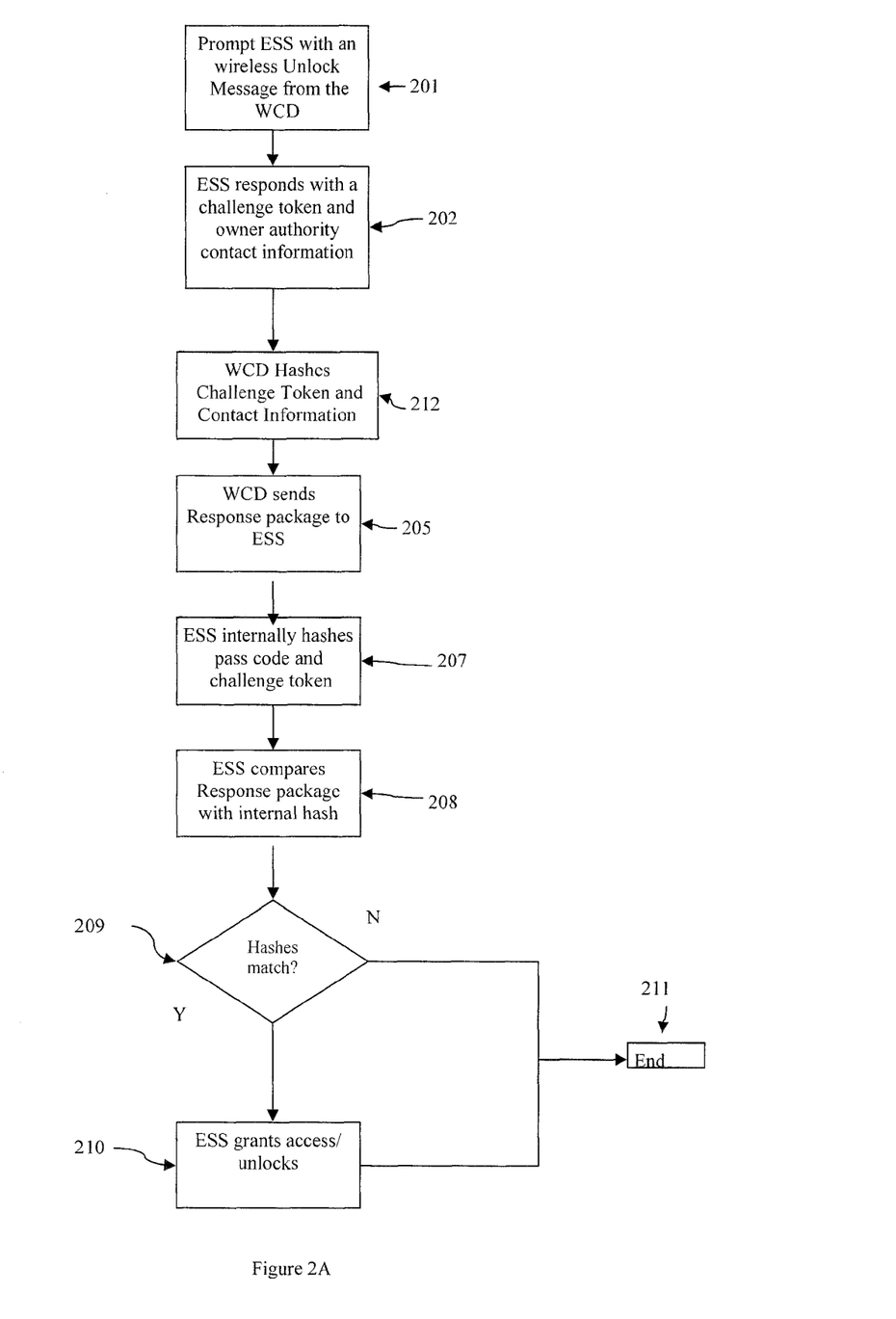
FIG. 2A is a flow chart of one example of a method for direct unlocking of an electronic security device by a wireless communication device.
Figure 2B:
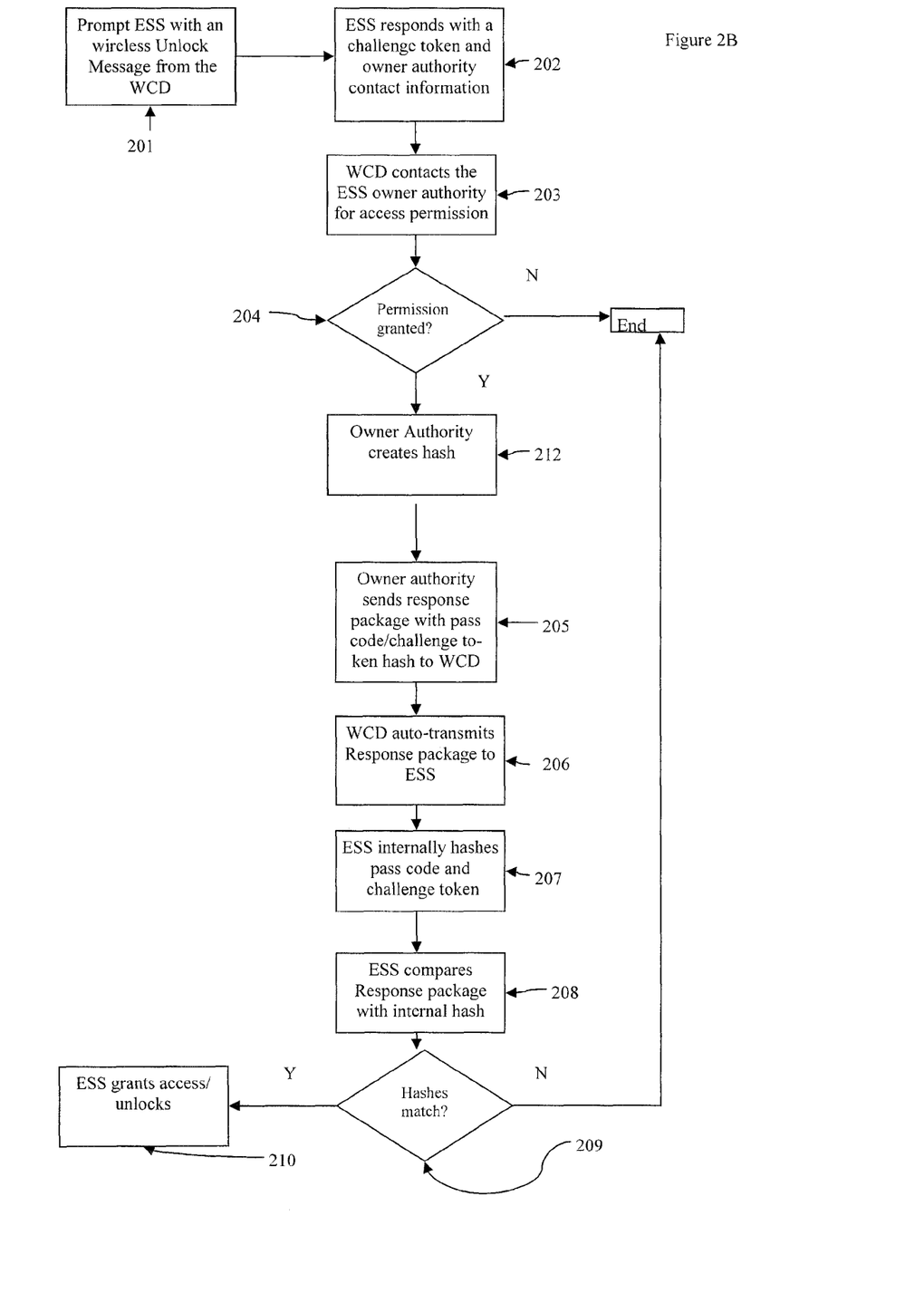
FIG. 2B is a flowchart of one example of a method for distributed access and control of an electronic security device using a wireless communication device.
Figure 2C:
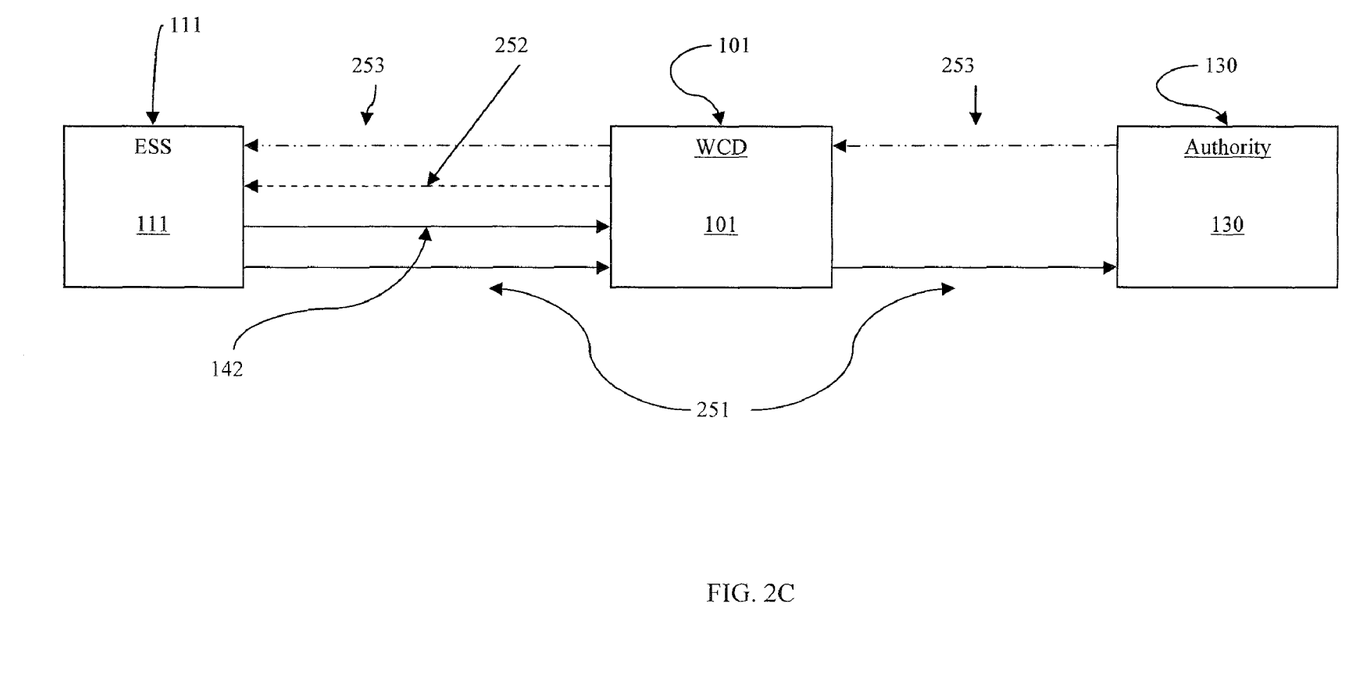
FIG. 2C is a depiction of data flow for the direct unlocking method and for distributed access and control of an electronic security device.

FIGS. 2A and 2C provide a method for secure one-time unlocking of ESS 111. The steps and processes described herein are exemplary. Steps may be added, steps broken down to component sub-steps and/or reordered their order may be modified without diverting from the disclosure herein.

At process 201, a WCD in close proximity to the ESS 111, such as the WCD 101, prompts ESS 111 to unlock or grant access by transmitting an unlock request message 252 to the ESS 111. The unlock request message 252 may be a generic query generated by a software object in the WDC 101. The software object may be a custom installed component or a standard component installed in all WDCs made by a particular manufacturer. In response to receiving the unlock request message 252, the ESS 111 may transmit a challenge token 251 and a set of ESS owner contact information 142 to WCD 101 at process 202. A challenge token may be any data string and may be randomly generated such that the token is different for each unlock attempt. The challenge token 251 may be used only one time. By placing it on an exclusion list, the challenge token 251 may be precluded from a second use indefinitely or it may roll off the list and be available for another use after a prescribed period of time chosen to achieve the best security. A challenge token 251 may also have a non-random portion characteristic of a particular ESS 111. Information other than contact data may also be used in place of, or along with, the owner contact data.

At process 212, processor 102 in WCD 101 creates the response package 253 by hashing the challenge token 251 received from ESS 111 with the ESS pass code 140. The ESS pass code 140 may be retrieved from WCD memory 104. The challenge token and pass code are first concatenated or combined and/or arranged in any suitable manner prior to being hashed. Hashing may be accomplished by any standard cryptographic algorithm. As non-limiting examples, algorithms such as SHA-1 or MD5 may be used. A simple hash may look like:

| Challenge Token | Pass Code | | | Response Package Hash |
|---|---|---|---|---|
| 49586734 | + "rottweiler" | → | Hash Algorithm | → 93ieiw384n96dbhe |

WCD 101 may then transmit the response package 253 to ESS 111 at process 205, including the hash. The response package may include other information as well.

At process 207, the ESS 111 may receive the response package 253. Upon receipt of the response package 253, the ESS 111 may retrieve from the lock memory 107 both the challenge token 251 that was previously generated and sent to WCD 101 and the ESS pass code 140 which may be persistently stored in lock memory 107. The ESS 111 then hashes the challenge token 251 and the ESS pass code 140, where the challenge token and pass codes are first concatenated or combined and/or arranged in the same manner as was done for the first (response package) hash. Alternatively, the ESS 111 may accomplish the hash upon sending the challenge token 251 to the WCD 101 at process 202 and storing the resulting hash in memory 104 or processor 102 until the response package 253 is received. The response package 253 may then be compared to the internally generated ESS hash at process 208. If the response package hash 253 matches the internally generated ESS hash, then the ESS 111 performs an unlocking or grants access at process 210. If the response package hash 253 does not match the internally generated ESS hash, then the ESS 111 does not perform an unlocking or grant access and the method ends at 211.

FIGS. 2B and 2C provide a method for distributed access for unlocking ESS 111. Steps may be added, steps broken down to component sub-steps and reordered without diverting from the disclosure herein.

At process 201, a WCD, in close proximity to the ESS 111, such as the WCD 101, prompts ESS 111 to unlock or grant access by transmitting an unlock request message 252 to the ESS 111. In response, the ESS 111 generates and transmits a challenge token 251 and transmits the token and a set of ESS owner contact information 142 to WCD 101 at process 202. The challenge token 251 may be any data string and may be randomly generated such that the token is different for each unlock attempt. The challenge token 251 may be used only one time and excluded thereafter in order to achieve the best security or it may be reused. According to embodiments, the challenge token 251 may also be placed on an exclusion list and precluded from a second use indefinitely, or the token may roll off the list and be available for a second use after a prescribed period of time. The challenge token 251 may also have a non-random segment characteristic of a particular ESS, such as the ESS 111. Information other than contact data may also be used in place of, or along with, owner contact data.

Upon receipt of the token 251 and the ESS owner contact information 142 at process 203, WDC 101 may request permission to unlock ESS 111 by auto-transmitting the challenge token 251 and the set of ESS owner contact information 142 to a communication device of an authority 130 with ownership control over ESS 111. The auto transmission may be accomplished by dialing and transmitting the request via cellular telephone network 120 to a cellular telephone number included in the owner contact data 142. Alternately or additionally, when a network other than a cellular network is being used, other information associated with the owner contact information 142 may be used to accomplish auto transmission including multiple auto transmissions sequentially and/or in parallel using pre-configured determining rules. Alternatively, the auto-transmission may be accomplished via text messaging, e-mail, FTP transmission, a web page or other electronic communication. At decision point 204 the authority 130 may then grant or deny permission to unlock the ESS 111. Denying permission ends the process at 211.

The authority 130 may grant access by recognizing the caller ID of the calling WDC 101 and then manually granting access through the communication device associated with the authority. The authority 130 may grant access based on voice recognition of a caller. The authority 130 may also automatically grant access by programming the communication device associated with the authority to consult a list of authorized WDCs stored in the memory of the communication device thereby granting permission if data identifying the calling WDC 101 is found on the list. Such identifying data may be a phone number, caller ID data, a device serial number, and authentication code. These methods of granting permission are merely exemplary and are not intended to be limiting. Other techniques to authenticate or authorize the requesting WDC 101 that may be known to the art may be desirable to achieve certain aspects.

If the authority 130 determines that the requesting WDC 101 is listed as an authorized or a trusted requester then in process 212 the communication device of the authority 130 may create a response package 253. The response package may be created by hashing the challenge token 251 received via WDC 101 with the ESS pass code 140 which may be persistently stored in a memory in communication with the communication device of the authority 130. The challenge token 251 and pass code 140 are first concatenated or combined and/or arranged in any suitable manner prior to being hashed. Owner authority 130 then transmits the response package 253, back to the WDC 101 at process 205, including the hash. Upon receipt at the WDC 101 the WDC may auto-transmit the response package to the ESS 111 via secondary transceiver 103 at process 206. Traditional security measures such as encrypted communications and authenticated nodes may be utilized in conjunction with the subject matter of this disclosure to prevent interception of any transmission described herein. As such, additional authentication may occur at any or all of the authority 130, WDC 101, and ESS 101.

At process 207, the ESS 111 may receive the response package 253 from WCD 101. Upon its receipt, the ESS 111 may retrieve from the lock memory 107 both the challenge token 251 that was initially generated and sent to WCD 101 and the ESS pass code 140 which may be persistently stored in lock memory 107. The ESS 111 may then hash the challenge token 251 and the ESS pass code 140, where the challenge and pass code are first concatenated or combined and/or arranged in the same manner as was done for the first (response package) hash. Alternatively, the ESS 111 may accomplish the hash upon sending the challenge token 251 to the WCD 101 and storing the result in memory 104 or processor 102 until the response package is received. In either case, The response package 253 hash may then be compared to the internal ESS hash at process 208. If the response package hash 253 matches the internal ESS hash, then the ESS 111 performs an unlocking or grants access at process 210. If the response package hash 253 does not match the internal ESS hash, then the ESS 111 does not performs an unlocking or grant access and the method ends at 211.

Figure 3:
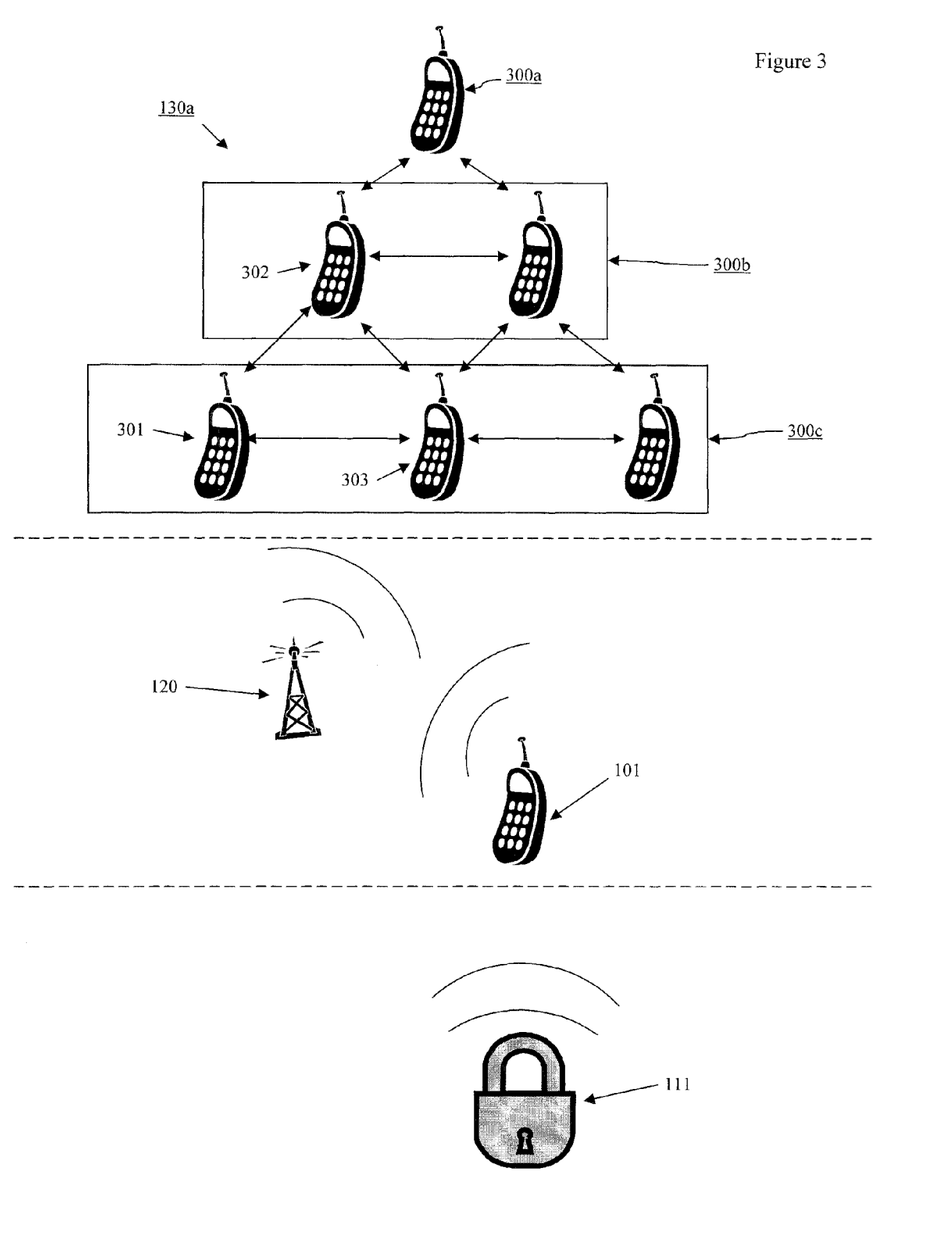
FIG. 3 is an abstract representation of one example of a system for the exemplary direct unlocking method and the exemplary method for distributed access and control of an electronic security device.

FIG. 3 is an abstract depiction of an integrated distributed authentication system. In situations in which an organization has a plurality of ESSs 111 or where access to one of the ESSs 111 may be shared among several users, authority to grant permission for access may be distributed among an authority hierarchy 130*a* wherein each subordinate level of the hierarchy may possess pass codes 140 to a subset of ESSs from those of the next senior level. Access may also be controlled by business function or by some other division of responsibility. As a non-limiting example, an owner authority may have six individuals in management that may have permission granting authority (i.e. pass codes) of one scope or another. The individual in tier 300*a* may be the Chief Executive Officer of the organization and have pass codes for all ESSs in the organization. Those individuals in tier 300*b* (e.g. vice presidents) may have permission granting authority only over ESSs in their area of responsibility which results in the same or lesser access to the same universe of pass codes that the Chief Executive Officer. Similarly, those individuals in tier 300*c* (e.g. managers) in turn may have even lesser authority which is restricted to ESSs in their immediate location. However, not all individuals or their WDCs may be available.

In this hypothetical example, ESS 111 may contain authority contact information 142 persistently recorded in lock memory 107 corresponding to the authority WDC 301 depicted in tier 300*c*. If WDC 301 is online and available, the distributed authorization process proceeds normally as described above in regards to FIG. 2B. If authority WDC 301 is not available or does not actually have the pass code for ESS 111, WDC 301 may contact another authority WDC in tiers 300*a*, 300*b* or 300*c* and auto-transmit the permission request to that other authority WDC (e.g. authority WDC 302 or 303). The permission request may be auto-transmitted to any number of authority WDCs until the permission request is positively denied, the permission request is granted or the request times out. If granted, a pass code 140 is sent to WDC 101 via telecommunications system 120 in which case the distributed authorization process proceeds normally as described above in regards to FIG. 2B. Telecommunication system 120 may be any of a variety of wireless network that can connect one WCD to another. Non-limiting, exemplary networks may include Wi-Fi, Wi-Max, cellular telephone and Satellite. In any case, a granted or denied indication may be sent to any WDC's involved in the permission chain as confirmation of the action taken. Such indication may also be recorded within a database in telecommunication system 120. Further, telecommunication system 120 may assume all of the processes of the method for a customer with the exception of actually granting access at Process 210.

As an added security measure against eavesdropping, requesting WDC's 101 may register with the owner authority 130*a*. By registering, owner authority 130*a* can ensure that the requester is an authentic requestor and not an intruder. Once registered, the requesting WDC 101 may be placed on an access list. In the simplest case, registration may occur when the owner authority recognizes the caller ID information on the screen of a WDC associated with the owner 130*a* or by voice. The owner authority 130*a* can then decide to grant or deny access by inspection. For more involved cases, a new requesting WDC 101 may be placed on an access list. Adding a new requesting WDC may entail the manipulation of one or a series of key strokes on a keypad, touch screen or it may require accessing a web page. Registration may also include an ask-and-learn process. Registration may also include the issuance of a password or an electronic authentication certificate to the new requesting WDC 101.

An illustrative example of a distributed authorization process may be a hotel situation where the owner authority is the hotel and the new requesting WDC 101 may be a new guest. Upon registering at the front desk, the guest provides his cell phone number which is added to the hotel's access list via the hotel's registration computer system and is also associated with his assigned door lock. Alternatively, the guest's WDC 101 may be contacted and an authentication code or password down loaded to the WDC 101. At this point the hotel can distinguish a legitimate guest from an eavesdropper and determine which locks (i.e ESSs) the guest has access to. Such locks may include access to the workout room, parking garage/deck, certain floors, and pool area, for example.

When the guest arrives at his room, the guest queries the door locking device 111. This query may be the manipulation of one or more buttons on the keypad of the WDC 101. The query may be transmitted from secondary transmitter 103 to the lock transceiver 108 via the Bluetooth® radio format. Door lock processor 109 may respond to the query by transmitting a challenge token 251 and the hotel contact information 142 to WDC 101 via lock transceiver 108 and secondary transceiver 103 using the Bluetooth® radio format. Not containing the pass code for the door lock 111 in memory 104, processor 102 may cause WDC 101 to retransmit the challenge token 251 to the hotel communication system as stipulated by the hotel contact information 142 via RF transceiver 105 and telecommunications system 120. Upon receiving the challenge token 251, the hotel searches among its authority WDCs 130a until the guest's cell phone number and door lock number is located on an access list. The authority WDC 130a with the pass code 140 to the guests door lock 111 may then hash the pass code 140 with the challenge code 251 and transmit the resulting hash 253 to door lock 111 via the cellular telephone system 120 and thus to the guests WDC 101. When door lock 111 receives the hash 253 from the hotel authority WDC 130a, via the guest's WDC 101, the door lock retrieves its pass code 140 and the challenge token 251 from lock memory 107 and hashes them together. Door lock 111 may then compare its hash to the hash 253 received from the hotel via the guest's WDC 101. If the hashes match then the door lock 111 may unlock. If the hashes do not match then the door lock 111 remains locked.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A wireless communication device comprising:
   a radio frequency (RF) transceiver for communicating wirelessly with a telecommunications network;
   a secondary transceiver for wirelessly communicating with an electronic security system, wherein the secondary transceiver transmits a wireless unlock message for electronically prompting the electronic security system and receives an unlock message response from the electronic security system including challenge data and electronic security system owner contact data for an authority having ownership of the electronic security system, wherein the RF transceiver auto-transmits the unlock message response to the authority having ownership of the electronic security system based on the electronic security system owner contact data included in the unlock message response, and receives a pass code for the electronic security system from the authority;
   a memory device;
   a processor in communication with the memory device, the RF transceiver and the secondary transceiver; and
   a computer readable medium having encoded thereon instructions which when executed by the processor computing device, generate a first concatenated hash combining challenge data transmitted from the electronic security system and the pass code for the electronic security system, wherein the hash is transmitted via the secondary transceiver to the electronic security system whereby the electronic security system is unlocked.

2. The wireless communication device of claim 1, wherein the electronic security system comprises:
   a lock transceiver;
   a lock memory device; and
   a processor in communication with the lock transceiver and the lock memory device, the processor generating the challenge data, generating a second concatenated hash using the challenge data and the pass code and comparing the first concatenated hash and the second concatenated hash.

3. The wireless communication device of claim 2, wherein the lock memory device also contains the pass code for the electronic security system.

4. The wireless communication device of claim 2, wherein the secondary transceiver and the lock transceiver communicate using a short range audio standards including at least one of Bluetooth®, Ultra-Wideband (UWB), Wireless USB (WUSB), Wi-Fi (IEEE 802.11), Zigbee (IEEE 802.15.4), WiMAX, WiBro, infrared, near-field magnetic and HiperLAN standards.

5. The wireless communication device of claim 2, wherein the secondary transceiver and the lock transceiver communicate optically.

6. The wireless communication device of claim 2, wherein the challenge data is a one-time randomly chosen data string.

7. The wireless communication device of claim 1, wherein the authority computes the first concatenated hash and provides the first concatenated hash to the wireless communication device, upon receiving the challenge data auto-transmitted by the electronic security system via the wireless communication device.

8. The wireless communication device of claim 1, wherein the electronic security system owner contact data includes at least one of a telephone number, an IP address, a web address, a name, a work address, and a home address of the owner of the electronic security system.

9. A method for distributed authentication comprising:
   electronically prompting an electronic security system with a wireless unlock message transmitted by a proximate wireless communication device;
   receiving an unlock message response from the electronic security system by the proximate wireless communication device including challenge data and electronic security system owner contact data for an authority having ownership of the electronic security system;
   auto-transmitting the unlock message response from the proximate wireless communication device to the authority having ownership of the electronic security system based on the electronic security system owner contact data included in the unlock message response;
   receiving a first hash value combining challenge data and a pass code for an electronic security system from the authority having ownership of the electronic security system; and
   auto-transmitting the first hash value to the electronic security system by the proximate wireless communication device, whereby the electronic security system is unlocked.

10. The method of claim 9, wherein the challenge data transmitted by the proximate wireless communication device remains valid for a single use.

11. The method of claim 9, wherein prompting the electronic security system and receiving an unlock message response are conducted by a short range radio format including at least one of Bluetooth®, Ultra-Wideband (UWB), Wireless USB (WUSB), Wi-Fi (IEEE 802.11), Zigbee (IEEE 802.15.4), WIMAX, WiBro, infrared, near-field magnetics and HiperLAN standards.

12. The method of claim 9, wherein communication between the proximate wireless communication device and the authority is accomplished by a cellular telecommunication system.

13. The method of claim 9, wherein the challenge data transmitted by the proximate wireless communication device remains valid for a specified time period.

14. The method of claim 9, wherein the electronic security device and the proximate wireless communication device communicate optically.

15. The method of claim 9, wherein the electronic security system owner contact data includes at least one of a telephone number, an IP address, a web address, a name, a work address, and a home address of the owner of the electronic security system.

16. A non-transitory computer readable medium containing instructions to:
   electronically prompt an electronic security system with a wireless unlock message;
   receive an unlock message response from the electronic security system including challenge data and electronic security system owner contact data for an authority having ownership of the electronic security system;
   auto-transmit the unlock message response to the authority having ownership of the electronic security system based on the electronic security system owner contact data included in the unlock message response;
   receive a response package from the authority, wherein the response package comprises a first hash value;
   transmit the first hash value to the electronic security system whereby the electronic security system is unlocked.

17. The non-transitory computer readable medium of claim 16, wherein the electronic security system owner contact data includes at least one of a telephone number, an IP address, a web address, a name, a work address, and a home address of the owner of the electronic security system.

\* \* \* \* \*